April 1, 1969 T. M. MOORE ET AL 3,436,533

DIGITAL LOG COMPUTER

Filed Nov. 29, 1965 Sheet 1 of 3

INVENTORS.
THOMAS M. MOORE and
EDWARD C. WATTERS

H. H. Losche
ATT'YS.

April 1, 1969 T. M. MOORE ET AL 3,436,533

DIGITAL LOG COMPUTER

Filed Nov. 29, 1965 Sheet 2 of 3

INVENTORS.
THOMAS M. MOORE and
EDWARD C. WATTERS

H. H. Losche
ATT'YS.

INVENTORS.
THOMAS M. MOORE and
EDWARD C. WATTERS

H. H. Losche
ATT'YS.

United States Patent Office 3,436,533

Patented Apr. 1, 1969

3,436,533

DIGITAL LOG COMPUTER

Thomas M. Moore, Severna Park, and Edward C. Watters, Annapolis, Md., assignors, by mesne assignments, to the United States of America as represented by the Secretary of the Navy Filed Nov. 29, 1965, Ser. No. 510,469
Int. Cl. G06f *5/00*
U.S. Cl. 235—154 11 Claims This invention relates to a digital log computer and more particularly to a means of sampling each bit from the most significant to the least significant bit of a binary number to be computed into a logarithm to control the addition into a digital accumulator digital numbers representative of the factors in a digital expansion corresponding to the input digital bits to accumulate a digital log number convertible into the logarithm of the input number, all without the use of an extensive look-up table.

In prior known means to compute the logarithm of a decimal number, look-up tables were used. The conventional look-up method of performing this function would require a look-up table of 127 eight-bit words with associated addressing circuitry for any seven bit number. This is a total of 1016 bits of storage in circuitry for readout to accomplish the computation of the logarithm of a seven bit input number.

In the present invention log computation for a seven bit binary input word is accomplished with only 106 bits of storage and a small quantity of computational circuitry. In this invention an input register of seven multivibrators are adapted to receive a seven bit binary word for which the logarithm is to be computed. Two log storage memories are set in accordance with corresponding address circuits representative of the logarithm of the most significant bit and the next most significant bit corresponding to the first two factors in a binary expansion. The logarithm storage of the third factor of the digital expansion is coupled to read into a low order register and the two log stores and low order register are coupled to be read into a log accumulator. A plurality of "and" and "or" gates and binary "1" detectors are interconnected with the input register, the log storage memories, and the low order register to gate clock and delayed clock pulses from a source to cause read-in of the log store memories and low order register representative of the factors of a binary expansion in accordance with the "1" sequence of the input binary word to accumulate a digital word representative of the logarithm of the input binary word. The log accumulator amount can then be read out providing the digital word of the logarithm of the input digital number. It is therefore a general object of this invention to provide a computer for computing the logarithm of a digital number by adding the logarithm of the factors of a digital series expansion corresponding to the sequence of the "1" bit detection of the digital number in an accumulator, the accumulated number being the digital logarithm of the input digital number.

These and other objects and the attendant advantages, features, and uses will become more apparent to those skilled in the art as a more detailed description proceeds when considered along with the drawings, in which.

Figure 1:
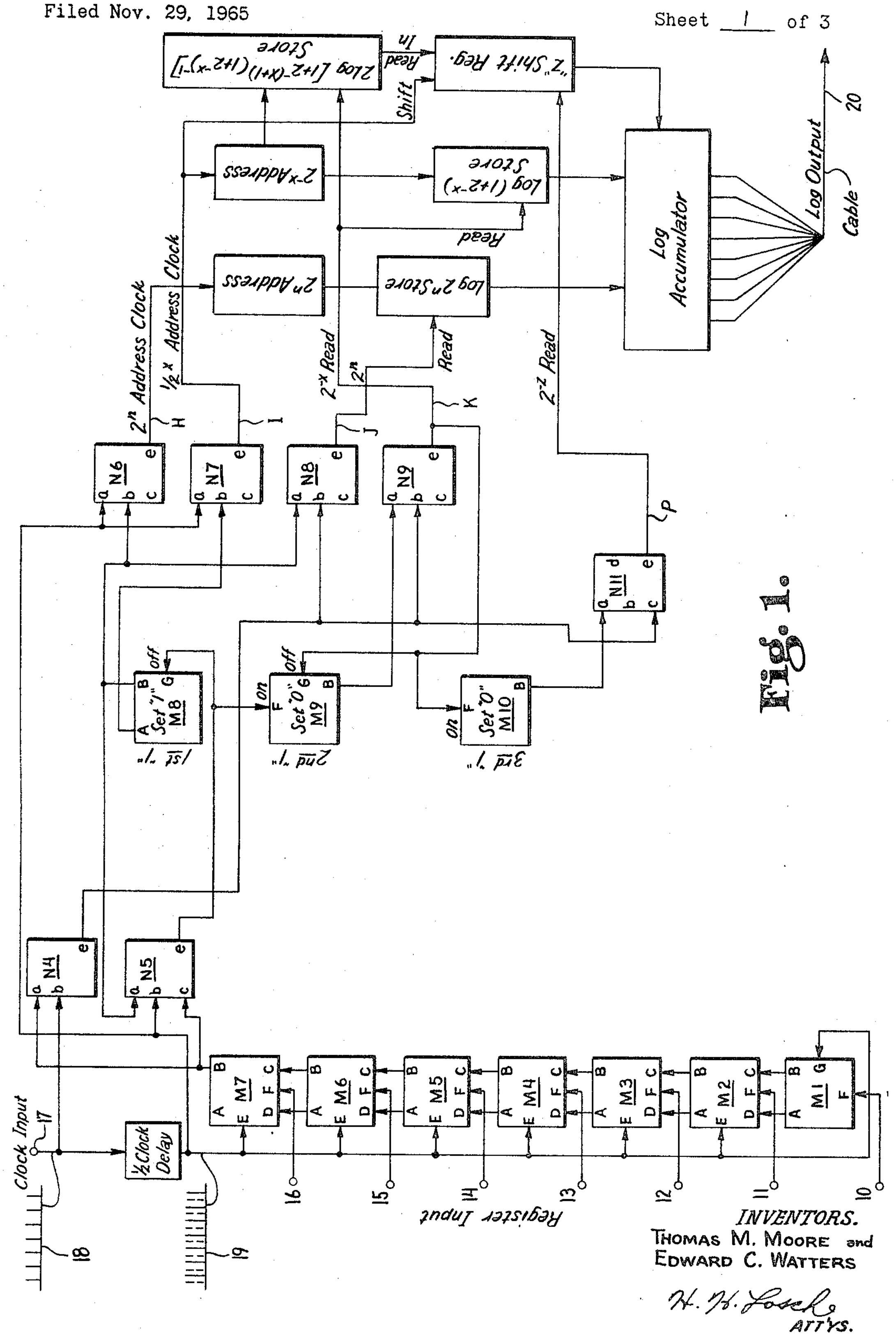
FIGURE 1 is a block diagram illustrating a simplified computer system with functional leads directing information in the direction of the arrows.
Figure 2:
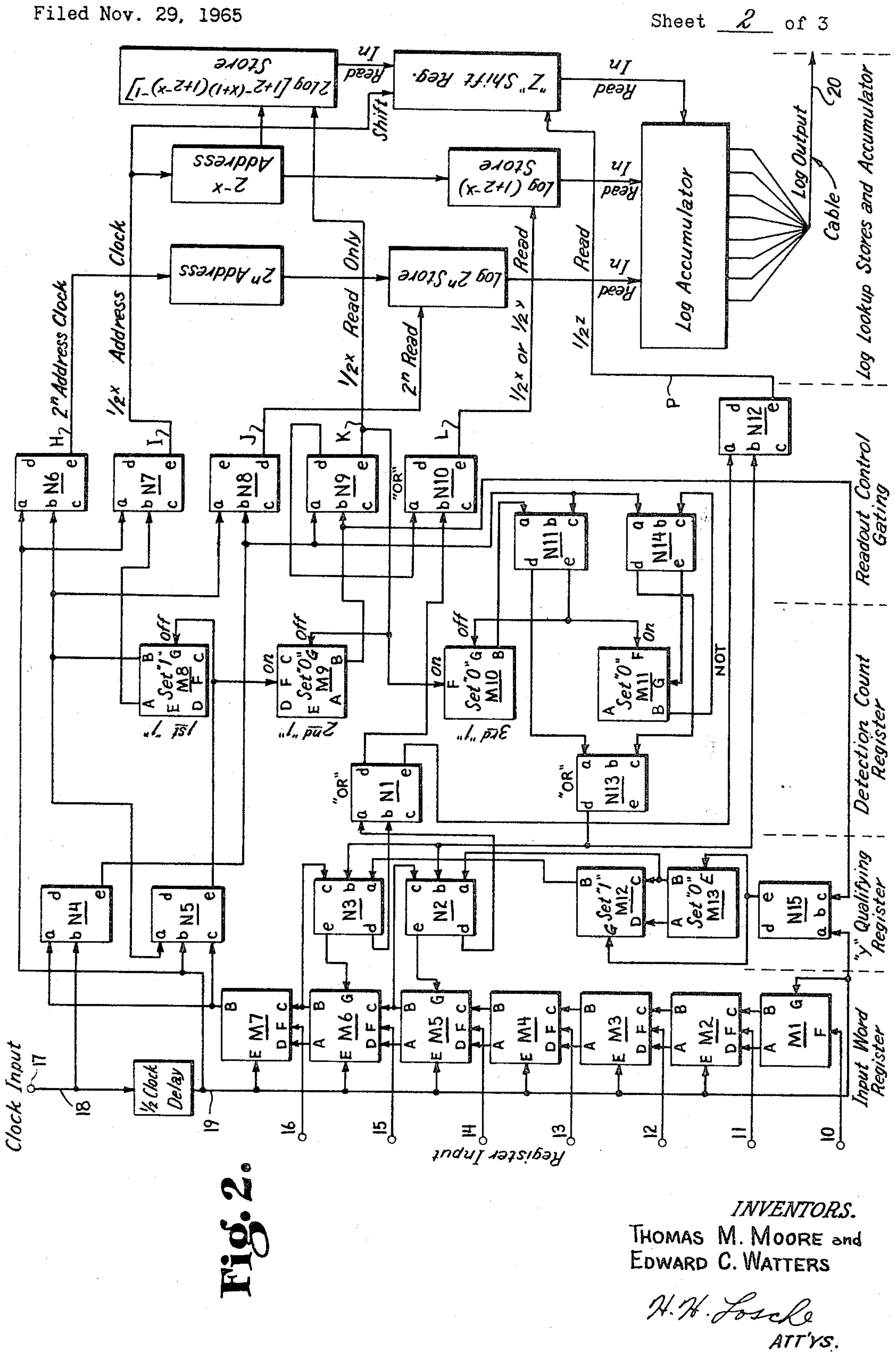
FIGURE 2 is a block diagram enlarging on FIGURE 1 to incorporate the *y* factor qualifying circuitry.

FIGURES 1 and 2 show block circuits of a simplified embodiment and a more complicated embodiment of a digital log computer, respectively, for any seven bit binary number which will express a logarithm to an accuracy of eight bits. However, a detailed description of these and other figures of the drawing will be given after the mathematical factorization basis is explained to clarify the purpose of some components and elements of the two embodiments shown in the figures.

As readily recognized, a number can be expressed in binary form to form a digital word. The fundamental digit form may be expressed in the following manner:

$$A_1 2^n + A_2 2^{n-1} + A_3 2^{n-2} \ldots A_{n+1} 2^0 \qquad (1)$$

where the "$A_x$" values are either "1" or "0." For a seven bit word the expression (1) becomes:

$$A_1 2^6 + A_2 2^5 + A_3 2^4 + A_4 2^3 + A_5 2^2 + A_6 2^1 + A_7 2^0 \qquad (2)$$

The actual quantity to be expressed will determine the values of the "A" coefficient for each power of two. For example, the decimal number 87 can be expressed as follow in binary form and factored:

$$87=1010111$$

$$87=(1)2^6+(0)2^5+(1)2^4+(0)2^3+(1)2^2+(1)2^1+(1)2^0$$

$$87=64 \quad + \quad 16 \quad + 4 \quad + 2 \quad + 1$$

$$87=2^6+2^4+2^2+2^1+2^0$$

$$87=2^6\left(1+\frac{1}{2^2}+\frac{1}{2^4}+\frac{1}{2^5}+\frac{1}{2^6}\right)$$

$$87=2^6\left[\left(1+\frac{1}{2^2}\right)\left[\frac{1+\frac{1}{2^2}}{1+\frac{1}{2^2}}\right]+\frac{1}{2^4}\left[\frac{1+\frac{1}{2^2}}{1+\frac{1}{2^2}}\right]+\frac{1}{2^5\left(1+\frac{1}{2^2}\right)}\right]$$

$$87=2^6\left(1+\frac{1}{2^2}\right)\left(1+\frac{1}{2^4}+\frac{1}{2^5\left(1+\frac{1}{2^2}\right)}\right)$$

$$87=2^6\left(1+\frac{1}{2^2}\right)\left(1+\frac{1}{2^4}\right)\left[1+\frac{1}{\left(\ +\frac{1}{2^2}\right)\left(1+\frac{1}{2^4}\right)}\right]$$

The log of this number can be expressed as:

$$\log 87=\log 2^6+\log\left(1+\frac{1}{2^2}\right)+\log\left(1+\frac{1}{2^4}\right)+\log\left[1+\frac{1}{2^5\left(1+\frac{1}{2^2}\right)\left(1+\frac{1}{2^4}\right)}\right] \qquad (3)$$

Solving this Equation 3.

$$\log 87=\log(64)+\log(1.25)+\log(1.062)+\log(1.023)$$

Expressed as a log to the base 10:

$$\log 64 = 1.8062$$
$$\log 1.25 = 0.0969$$
$$\log 1.062 = 0.0265$$
$$\log 1.023 = 0.0099$$

$$\log 87 = 1.9395$$

These four factors in Equation 3 can be expressed as:

$$\log 2^n+\log\left(1+\frac{1}{2^x}\right)+\log\left(1+\frac{1}{2^y}\right)+\log\left[1+\frac{1}{2^z\left(1+\frac{1}{2^x}\right)\left(1+\frac{1}{2^y}\right)}\right] \quad (4)$$

Or:

$$\log 2^n+\log(1+2^{-x})+\log(1+2^{-y})+\log[1+2^{-z}(1+2^{-x})-1(1+2^{-y})^{-1}] \quad (5)$$

In addition, it may be shown that any seven bit binary number may be approximated by a combination of factors of the following forms:

$$2^n$$
$$1+2^{-x}$$
$$1+2^{-y}$$
$$1+2^{-z}(1+2^{-x})^{-1}$$

in which the first most significant bit (MSB) "1" is exactly evaluated to the $2^n$ factor; the second MSB "1" is exactly evaluated to the $x$ factor, $(1+2^{-x})$; the third MSB "1" is evaluated approximately to the $y$ factor $(1+2^{-y})$; and later occurring "1" bits are approximated by the $z$ factor. It may be realized that the smallest binary number, other than zero, would always have the $2^n$ factor and that the $x$, $y$, and $z$ factors would qualify as the second MSB to lower "1" bits occurred in the binary number to be computed into the logarithm. Accordingly, $n$ is determined by the location of the first or most significant bit "1" in the digital word; $x$ is determined by the number of bits between the first and second "1" in the digital word; $y$ is determined by the number of bits between the $n$ "1" and the first of two "1's" (other than $x$) separated by the same number of bits as $n$ and $x$, or, in other words, a $y$ is obtained any time that the digital number contains a second pair of "1's" having the same separation as the most significant $n$ and $x$ bits; and $z$ is the location of any "1" after $n$ which does not qualify as an $x$ or a $y$. These rules are used to determine the log of a digital number with one additional—the second "1" required to qualify a $y$ bit cannot become a $z$ bit. A few examples of the $y$ and $z$ qualification will be given in the following table, the use of which will become clear in the computer combination of computing the logs of digital numbers:

TABLE 1

| Decimal No. | Digital No. | | | | | | |
|---|---|---|---|---|---|---|---|
| | | | n | x | y | y | z |
| 31 | 0 | 0 | 1 | 1 | 1 | 1 | 1 |
| | | n | | x | y | z | y |
| 47 | 0 | 1 | 0 | 1 | 1 | 1 | 1 |
| | | n | x | z | | y | y |
| 59 | 0 | 1 | 1 | 1 | 0 | 1 | 1 |
| | n | | x | | y | z | y |
| 87 | 1 | 0 | 1 | 0 | 1 | 1 | 1 |

As stated hereinabove the four types of factors of the digital expansion, expression (4) or (5), and reduced to the four factors listed, provide a close approximation for all log conversion; however, only the logarithm of a seven bit digital number to a final accuracy of eight bits is considered. The general approach to synthesis of other log computers with more accuracy or greater capacity is identical to that disclosed herein above but similar approximations would be utilized and the implementation would become more complex. While these approximations could be shown by factorization analysis, it may be summarily stated that the error of the logarithm is less than half the value of the least significant bit. For maximum accuracy, let the maximum eight bit number (255) represent the logarithm of the maximum seven bit number (127). Since the common logarithm of 127 is 2.1038, then a change of one bit in the eight bit logarithm corresponds to a change in the common logarithm of $$2.1038/255=.00825$$

Therefore, the least significant bit (LSB) in the eight bit logarithm that is generated corresponds to a change of .00825 in the common logarithm. Thus, .00825 will be referred to as the LSB herein.

In determinating the $z$ values from the expression (4) above, or $$\log\left[1+\frac{1}{2^z\left(1+\frac{1}{2^x}\right)\left(1+\frac{1}{2^y}\right)}\right]$$

it may be realized that the quantity $$1+\frac{1}{2^y}$$

becomes so small in the $z$ values that it can be neglected. The expression (4) can then be written:

$$\log 2^n+\log\left(1+\frac{1}{2^x}\right)+\log\left(1+\frac{1}{2^y}\right)+\log\left[1+\frac{1}{2^z\left(1+\frac{1}{2^x}\right)}\right] \quad (6)$$

Here the $z$ factor is generalized, as shown in the list of four factors, and not given as a power of 5 since the power of 5 is for the example of the decimal number 87. Since the smallest posible $z$ value must be one greater than the $x$ value, expression (6) has a maximum value of $$\log 2^n+\log(1+2^{-x})+\log(1+2^{-y})+\log[1+2^{-(x+1)}(1+2^{-x})^{-1}] \quad (7)$$

For all situations the expression (6) may be written as the following:

$$\log N\approx\log 2^n+K_1\log(1+2^{-x})+K_2\log 1+2^{-y})+\left(K_3+\frac{K_4}{2}+\frac{K_5}{4}+\frac{K_6}{8}+\frac{K_7}{16}\right)\log[1+2^{-(x+1)}(1+2^{-x})^{-1}]$$

where;

$$K_1, K_2 \ldots =0 \text{ or } 1$$

In the example of finding the log of the number 87, $K_1=1$, $K_2=1$, and $K_5=1$, but all other $K$'s$=0$. Expression (7), then, includes the four types of log factors used in the address and storage circuits, soon to be described, to provide the digital logarithm of any number to eight digital bits. For convenience in the understanding of the use of the four factors in providing logarithms, the values of the logs used as store values will be listed below based on the log to the base 10 and the LSB equal to 0.00825:

TABLE 2

[Values of $2^n$]

| | Value | Common Log | Digital Word |
|---|---|---|---|
| Address Bit No.: | | | |
| 1 | $2^6$ | 1.8062 | 1 1 0 1 1 0 1 1 |
| 2 | $2^5$ | 1.5051 | 1 0 1 1 0 1 1 1 |
| 3 | $2^4$ | 1.2041 | 1 0 0 1 0 0 1 0 |
| 4 | $2^3$ | 0.9031 | 0 1 1 0 1 1 0 1 |
| 5 | $2^2$ | 0.6021 | 0 1 0 0 1 0 0 1 |
| 6 | $2^1$ | 0.3010 | 0 0 1 0 0 1 0 0 |
| 7 | $2^0$ | 0.0000 | 0 0 0 0 0 0 0 0 |

TABLE 3

[Values of $1+2^{-x}$ or $1+2^{-y}$ Store]

| | Value | Common Log | Digital Log |
|---|---|---|---|
| Address Bit No.: | | | |
| 1 | $1+\frac{1}{2}$ | 0.1761 | 0 0 0 1 0 1 0 1 |
| 2 | $1+\frac{1}{2^2}$ | 0.0969 | 0 0 0 0 1 1 0 0 |
| 3 | $1+\frac{1}{2^3}$ | 0.0511 | 0 0 0 0 0 1 1 0 |
| 4 | $1+\frac{1}{2^4}$ | 0.0263 | 0 0 0 0 0 0 1 1 |
| 5 | $1+\frac{1}{2^5}$ | 0.0133 | 0 0 0 0 0 0 1 0 |
| 6 | $1+\frac{1}{2^6}$ | 0.0065 | 0 0 0 0 0 0 0 1 |

TABLE 4

[Values of $[1+2^{-(x+1)}(1+2^{-x})^{-1}]$ Store]

| | Value | Common Log | Digital Log |
|---|---|---|---|
| Address Bit No.: | | | |
| 1 | $1+\frac{1}{2^2\left(1+\frac{1}{2}\right)}$ | 0.0669 | 0 0 0 0 1 0 0 0 |
| 2 | $1+\frac{1}{2^3\left(1+\frac{1}{2^2}\right)}$ | 0.0414 | 0 0 0 0 0 1 0 1 |
| 3 | $1+\frac{1}{2^4\left(1+\frac{1}{2^3}\right)}$ | 0.0231 | 0 0 0 0 0 0 1 1 |
| 4 | $1+\frac{1}{2^5\left(1+\frac{1}{2^4}\right)}$ | 0.0124 | 0 0 0 0 0 0 1 0 |
| 5 | $1+\frac{1}{2^6\left(1+\frac{1}{2^5}\right)}$ | 0.0064 | 0 0 0 0 0 0 0 1 |

TABLE 5

[Values obtained from z Shift Register]

| | Value | Common Log | Digital Word |
|---|---|---|---|
| Shift No.: | | | |
| 0 (Stored) | $1+\frac{1}{2^2\left(1+\frac{1}{2}\right)}$ | 0.0669 | 1 0 0 0 |
| 1 | $1+\frac{1}{2^3\left(1+\frac{1}{2}\right)}$ | 0.0346 | 0 1 0 0 |
| 2 | $1+\frac{1}{2^4\left(1+\frac{1}{2}\right)}$ | 0.0177 | 0 0 1 0 |
| 3 | $1+\frac{1}{2^5\left(1+\frac{1}{2}\right)}$ | 0.0086 | 0 0 0 1 |
| 4 | $1+\frac{1}{2^6\left(1+\frac{1}{2}\right)}$ | 0.0043 | 0 0 0 1 |
| 0 (Stored) | $1+\frac{1}{2^3\left(1+\frac{1}{2^2}\right)}$ | 0.0414 | 0 1 0 1 |
| 1 | $1+\frac{1}{2^4\left(1+\frac{1}{2^2}\right)}$ | 0.0212 | 0 0 1 0 |
| 2 | $1+\frac{1}{2^5\left(1+\frac{1}{2^2}\right)}$ | 0.0107 | 0 0 0 1 |
| 3 | $1+\frac{1}{2^6\left(1+\frac{1}{2^2}\right)}$ | 0.0052 | 0 0 0 1 |
| 0 (Stored) | $1+\frac{1}{2^4\left(1+\frac{1}{2^3}\right)}$ | 0.0231 | 0 0 1 1 |

TABLE 5—Continued

| | Value | Common Log | Digital Word |
|---|---|---|---|
| Shift No.:—Cont. | | | |
| 1 | $1+\frac{1}{2^5\left(1+\frac{1}{2^3}\right)}$ | 0.0119 | 0 0 0 1 |
| 2 | $1+\frac{1}{2^6\left(1+\frac{1}{2^3}\right)}$ | 0.0060 | 0 0 0 1 |
| 0 (Stored) | $1+\frac{1}{2^5\left(1+\frac{1}{2^4}\right)}$ | 0.0124 | 0 0 1 0 |
| 1 | $1+\frac{1}{2^6\left(1+\frac{1}{2^4}\right)}$ | 0.0064 | 0 0 0 1 |
| 0 (Stored) | $1+\frac{1}{2^6\left(1+\frac{1}{2^5}\right)}$ | 0.0064 | 0 0 0 1 |

These tables will be referred to in the later description of FIGURES 1 and 2.

FIGURE 1

Referring more particularly to FIGURE 1, which illustrates in a block circuit schematic a simplified embodiment of the invention, exclusive of the *y* qualifying means, there is illustrated an Input Register consisting of multivibrators M1 through M7. Each multivibrator M1 through M7. Each multivibrator M1 through M7 has two outputs A and B and inputs C through G. These multivibrator circuits are of the well known type but will be more fully described in the description of FIGURE 3 to clarify their operation in the Input Register. Each input terminal F of the Input Register multivibrators has input terminals 10 through 16 coupled repectively thereto to place a digital number in this register corresponding to a decimal number for which the logarithm is to be computed. The LSB M1 has its outputs A and B coupled respectively to the inputs D and C of the next higher bit in the input register and like couplings are made between M2 and M3, M3 and M4, and so on, from M6 to M7 in a manner to accomplish results soon to be made clear. An input of a clock pulse source is coupled to terminal 17 to produce a series of clock pulses as shown by the voltage waveform 18 and this terminal 17 is coupled to a half clock delay network to produce on its output the one-half clock voltage pulses as shown by the voltage waveform 19. The output of the one-half clock delay network is coupled respectively to the E terminals of the multivibrator Input Register M2 through M7 and to the G terminal of M1. Whatever digital number is inserted in the Input Register, the half clock pulses applied to this register will cause the digital bits to move upward one bit as each half clock delay pulse is applied.

The output terminal B of the MSB of M7 is coupled respectively to *a* and *c* terminals of "and" gates N4 and N5 while the terminal 17 of the clock input source is coupled to terminal *b* of N4 and the half clock delay pulse is coupled to terminal *b* of N5. The N circuits N4 and N5, as well as N6 through N11, each have terminals *a*, *b*, *c*, *d*, and *e*, of which *a*, *b*, and *c* are the input terminals and *d* and *e* are the output terminals. These N circuits will be more fully described hereinbelow in the detailed description of FIGURE 4 and are used herein as "and" and "or" gates in a manner well understood by those skilled in the art.

Three additional multivibrator circuits M8, M9, and M10 constitute a first "1" detector, a second "1" detector, and a third "1" detector, respectively. These "1" detection multivibrators M8, M9, and M10 are of the same construction as the multivibrators in the Input Register, the description of which will become clear at the time of the description of FIGURE 3. The first "1" detector M8 has an output A coupled to the *b* terminal of a readout control "and" gate N7, a B output terminal coupled to the *a* input terminal of N5, the *b* input terminal of N6, and the *a* input terminal of N8. The *e* output terminal of N5 is coupled to the G input terminal of M8 and to the F input terminal of M9. The *e* output terminal of "and" gate N4 is coupled in parallel to the *b* input terminals of N8, N9, and N11. The B output terminal of M9 is coupled to the *a* input terminal of N9. The output terminals of the readout control "and" gates N6 through N9 and N11 are coupled to output conductors H, I, J, K, and P, respectively. The output terminal *e* of N9, being the output conductor K, is coupled in parallel to the input terminal G of M9 and the input terminal F of M10. The above circuitry describes the coupling of the Input Register, the "1" detectors, and the gating circuitry to detect and gate the "1's" as they occur in their upward progress to the MSB, M7, to produce pulse outputs on the output conductors H, I, J, K, and P controlling the log, store, and accumulator circuitry.

The log, store, and accumulator circuitry consists of a $2^n$ Address coupled to the $2^n$ Log Store which is in turn coupled to the Log Accumulator. The $2^n$ Address and Log Store makes provision for the first factor in the series as shown in the expression (7) hereinabove. The second and third log factors in expression (7) above is illustrated herein as a $2^{-x}$ Address coupled to the Log $(1+2^{-x})$ Store, the output of which is coupled to the Log Accumulator. The $2^n$, $(1+2^{-x})$ and *z* factors are all that are used in FIGURE 1 since all *y* factors are called out of the *z* Register. After the $2^n$ and $(1+2^{-x})$ log factors are added into the Log Accumulator, the *z* factors are then added into the Log Accumulator in accordance with the "1's" other than *n* and *x*.

The fourth log factor in expression (7) above is stored as shown in the block identified as 2 Log $[1+2^{-(x+1)}(1+2^{-x})^{-1}]$ Store which is coupled to be read into a *z* Shift Register that is coupled to the Log Accumulator. The Log Accumulator, as will later be made clear in the description of FIGURE 5, has an eight bit parallel sum and storing means to provide the eight bit output on a cable 20 providing the number representative of the logarithm output of any decimal number applied to the input register terminals 10 through 16 in binary form. The H output of N6 is coupled to the $2^n$ Address to cause it to shift up, as shown in Table 2 hereinabove, with each address clock pulse. The I output of N7 is coupled to the $2^{-x}$ Address and also to the *z* Shift Register to cause the $2^{-x}$ Address Register to shift up in accordance with the address bit number as shown by Table 3 hereinabove. The $2^{-x}$ Address Register has an output coupled to the 2 Log $[1+2^{-(x+1)}(1+2^{-x})^{-1}]$ Store to cause it to shift down one digital bit which, in actual practice, causes the 2 Log Store to read one-half its value or merely the log of the store, as shown in Table 4. This I output of N7, being coupled to the *z* Shift Register, causes this register to shift down with each input pulse as shown by Table 5 hereinabove.

*FIGURE 1 operation*

In the operation of the simplified version of the digital log computer as shown in FIGURE 1, the binary word of the decimal number placed in the Input Register by way of terminals 10 through 16 will include the MSB in M7 down to the LSB in M1. Upon the application of the first clock pulse, if the MSB is a "1," the output terminal B will have a zero voltage signal thereon which is applied to terminal *a* of N4 and terminal *c* of N5 opening these gates. The clock pulse applied to terminal 17 and to terminal *b* of N4 will be gated through N4 to the terminal *b* of N8. The first "1" detector M8 is preset to provide a "1" or zero voltage output on its output terminal B and a negative voltage on output terminal A. This places the readout control "and" gate N8 in an open (or conductive) condition—and "and" gate N7 in the closed or nonconductive condition—to pass the clock pulse from N4 through N8 to its output terminal J, which is coupled as a readout input to the Log $2^n$ Store. This readout will cause the Log $2^n$ Store to be placed in the Log Accumulator. If the MSB of M7 had been a "0," there would have been no output on the conductor J. The half clock pulse of the half clock delay network is applied to terminal *b* of N5 as well as to terminal *a* of N6 and terminal *a* of N7. Since M8 was set in its "1" condition to produce a zero voltage on output terminal B, gate N6 would be open to pass the half clock pulse on the output H to advance the $2^n$ Address; however, since the Log $2^n$ Store has already been read out, the $2^n$ Address advance will be of no consequence. If in the condition that M7 would have originally been a "0," the one-half clock address pulse would have advanced the $2^n$ Address register which in like manner would have advanced the Log $2^n$ Store to its second address bit as shown in Table 2. The half-clock pulse from the half-clock delay network applied to terminal *b* of N5 will also be applied to the G terminal of M8 and the F terminal of M9 to place a zero voltage output on the A terminal of M8 and a negative voltage on the output terminal B of M8 to place M9 in its "1" detection state in which a zero voltage is produced on its output terminal B. The first half clock delayed pulse applied to the Input Regitser will advance the next MSB from M6 to M7. If this second MSB is a "1" the operation through N4 and N5 will be the same as hereinabove described but the output *e* from N4 will now be conducted through the readout control "and" gate N9 to the output terminal K since N9 is now open and N8 is now closed. This K output is applied to the 2 Log Store to cause it to be read into the *z* Shift Register and also is applied to the log $1+2^{-x}$ Store to cause it be read into the Log Accumulator. The one-half clock pulse will now be applied through the readout control "and" gate N7 to the output terminal I to advance the $2^{-x}$ Address to shift same upwards and is applied to the *z* Shift Register to shift same downward, as shown by Tables 3 and 5. In like manner the 2 Log Store is shifted down, as shown by Table 4. The output K of N9 also turns "off" M9 and turns "on" M10. Accordingly, any succeeding "1's" progressing upwardly in the Input Register by triggering of the one-half clock delay pulses to the MSB, M7, will cause conduction of the clock input pulse from 17 to be conducted through "and" gate N4 and "and" gate N11 to output P to cause readout of the *z* Shift Register into the Log Accumulator to cause the digital words of this register, as shown by Table 5 above, to be accumulated in the Log Accumulator along with the log factors of $2^n$ and log of $1+2^{-x}$. Since FIGURE 2 is of greater complexity in qualifying y factors, an example of operation will be deferred until the operation of FIGURE 2 is described.

*FIGURE 2*

Referring more particularly to FIGURE 2, where like parts as shown in FIGURE 1 are identified by the same reference characters or legends in this figure, the digital log computer includes, in addition to that of FIGURE 1, a *y* qualifying register and a detection count register for use in causing readout of the four factors of expression (7) into the Log Accumulator to acquire greater accuracy of logarithm output on the output conductor 20. The Input Register including M1 through M7 and the clock input source 17 are coupled to the "and" gates N4 and N5 and to the first, second, and third "1" detectors M8, M9, and M10, respectively, as shown and described for FIGURE 1. In this figure an "or" gate N1 and "and" gates N2 and N3 are coupled in the *y* qualifying register having the additional multivibrator "1" detectors M12 and M13 and an "and" gate N15. The "or" gate N1 has input terminals *a*, *b*, and *c*, and output terminals *d* and *e* in the same manner as the "and" gate circuits, which will be more fully described in detail in the description of FIGURE 4. "And" gates N2 and N3 each have an output *e* coupled to the G input terminals of M5 and M6, respectively. The *d* output of N2 is coupled to the *a* input of N1 while the *d* output of N3 is coupled to the *b* input of N1. The *d* output of N1 is coupled to the *b* input terminal of an "or" gate N10, and the *a* input terminal of "or" gate N10 is coupled to the *d* output of N9. The B output of M12 is coupled to the *a* input of N3 while the B output of M13 is coupled to the *a* input of N2. The B output of M5 is coupled to the *c* input of N2 while the B output of M6 is coupled to the *c* input of N3. The *d* output of N11 in this figure is coupled to the *a* input of an "or" gate N13 and the *d* output of N13 is coupled in common to the *b* input terminal of each "and" gate N2 and N3 as well as to the *b* input of a readout control "and" gate N12. The *e* output of the "or" gate N1 is coupled to the *a* input of N12. An additional multivibrator M11 has its B output coupled to the *c* input terminal of an "and" gate N14, the output *d* of this "and" gate N14 is coupled to the *c* input of the "or" gate N13, and its *e* output terminal is coupled to the G input of M11. The output *e* from the "and" gate N4 is coupled as described in FIGURE 1 and, in addition, is coupled to the a terminal of N14. The output *e* of the readout control "and" gate N12 constitutes the output conductor P in this figure. The half-clock delay pulse coupled to the Input Register is likewise coupled to the *a* terminal of the "and" gate N15 while the input terminal *c* of this "and" gate is coupled to the output B terminal of M9. The output *e* terminal of N15 is coupled to the G terminal of M12 and the E terminal of M13, in common. M12 is normally preset to its "1" state in which zero voltage is on its output terminal B while the multivibrator M13 is preset to its "0" state in which its output terminal B is of negative potential.

*FIGURE 2 operation*

In the operation of FIGURE 2 let it be assumed that the decimal number to be computed into a logarithm is converted to its binary counterpart and its binary number placed in the input register with the MSB in M7 progressing to the LSB in M1. When a "1" appears in M7, N4 will pass the clock pulse to N8 which is controlled by the preset "1" side B terminal of M8 and is therefore open to pass the pulse to the output conductor J. This J output pulse from N8 is used to trigger the readout of the Log $2^n$ Store. This log digital word is representative of $2^6$ store as shown in Table 2 which digital log word is read into the Log Accumulator where it is buffer stored. This same readout clock pulse is fed to the one-half clock delay network, the output of which will produce an H output from N6 to advance the $2^n$ Address which is immaterial since the log $2^n$ has already been read out. The delayed clock pulse will also pass through N5 to turn "off" M8 setting its B output to a negative potential and turning "on" M9 setting its B output to a zero voltage. The one-half clock delay pulse will also shift the Input Register to bring the second MSB up as the M7 bit. The delayed one-half clock pulse will not pass through N7 or N15 due to the inherent delays in changing the gate condition. The second "1" detection counter M9 controls N9 and N15 both of which are now open. If the second MSB from M6, which is now M7 of the input word, is a "1", the second clock pulse will pass through "and" gates N4 and N9 as well as "or" gate N10 to produce a K output and an L output, respectively. The $2^{-x}$ Address has been previously preset to 0 0 0 0 0 1 and will therefore address the first or highest log values in both the Log $(1+2^{-x})$ Store and the 2 Log $[1+2^{-(x+1)}(1+2^{-x})^{-1}]$ Store. The K output will read out the addressed 2 log $[1+2^{-(x+1)}(1+2^{-x})^{-1}]$ value into the *z* shift register and will also turn "off" M9 and turn "on" M10. The L output of N10 will read out the addressed value of log $(1+2^{-x})$ into the Log Accumulator where it will be added to the $2^n$ value already present. The first address bit, as shown in Table 3, will place the digital log word of this first address bit into the Log Accumulator to be added to the digital word of the address bit of the factor $2^6$ already in the Log Accumulator. The delayed clock pulse output will pass through N7 to shift up the $2^{-x}$ Address to 0 0 0 0 1 0 and will shift down the *z* shift register to produce a value of log $[1+2^{-(x+1)}(1+2^{-x})^{-1}]$. However, since M9 has been turned "off" by the K output, N15 is closed and the preset value of M12, M13 to "1, 0" in the *y* qualifying register will not be disturbed. This count represents a one bit separation between the *x* and *n* values.

If *n* and *x* are separated by two bits (1, 0, 1 - - -) the second clock pulse will not fined a "1" in M7 and nothing will read out; however, the $2^{-x}$ address will advance and N15 will now pass the delayed clock pulse to shift down the *y* qualifying register to a value of "0, 1" for M12, M13 respectively, which represents a two bit separation of *n* and *x*. The third clock pulse of the sequence for a "1" detection will now pass N4 and read out the log values of $(1+2^{-x})$ as previously described with only the address being different.

For a three bit separation (1, 0, 0, 1 - - -) an additional pulse will pass through N15 to produce a count "0, 0" for M12, M13, respectively, in the *y* qualifying register. Only two bits are required since only seven bits are used in the original word and therefore a *y* value can never be qualified if *n* and *x* are separated by more than two bits. As an example, in the word 1 0 1 1 0 1 0 to third "1" from the left will qualify as a *y* value since the third and fourth "1's" are separated by the same number of bits as the first and second "1's." Further, in the example of 1 0 0 1 1 0 0, the third "1" from the left can never qualify as a *y* value as there are not enough bits left to allow a three bit separation. The process will continue until a second "1" or $2^{-x}$ detection is made and M10 is turned "on" and M9 turned "off."

When a third "1" is detected in M7, N4 will pass the pulse to N11 which is now open. The *d* output of N11 applied to the *a* input of N13 passes through this "or" gate N13 and is applied to N2, N3, and N12. If the $n-x$ separation has been found to be one bit, where M2=1 and M13=0, and M7 and M6 both contain "1's", N3 will pass the pulse out of N13 through N3 and through the "or" gate circuit N1 to the "or" gate N10. This means that the third detection qualifies as a *y* value and the output from N3 will be fed back to erase the "1" from M6, pass through "or" gates N1 and N10 to produce the L output which reads out the addressed value of log $(1+2^{-y})$ which is the equivalent of the log $(1+2^{-x})$ since the addressed value of the $2^{-x}$ has been continued to advance even though log $(1+2^{-x})$ has been read out. The output of "or" gate N1 is also, in effect, inverted at its output *e* and "and" gated at N12 output to produce a NOT function with N13. The gate N12 is therefore closed to the output from the "or" gate N1.

If the *y* qualifying register shows a two bit separation (1, 0, 1 - - -) in which M12 is now equal to "0", M13 is now equal to "1" and M5 contains a "1", the process is identical except the pulse now passes through N2, N1, and N10 to the output L. If M12 and M13 are both "0" or if the appropriate "1" is not located in M5 or M6, both N2 and N3 will be closed and N1 will not pass an inverted signal to block N12. Therefore, the detection does not qualify as a *y* value and the N13 output will pass through N12 and appear on output conductor P. This trigger will now read out the value of the *z* Shift Register into the Log Accumulator.

The *z* Shift Register originally received a log value of 2 log $[1+2^{-(x+1)}(1+2^{-x})^{-1}]$ when a $2^{-x}$ detection was obtained. This value was shifted to log $$[1+2^{-(x+1)}(1+2^{-x})^{-1}]$$

for the first $2^{-x}$ detection and will be shifted down one bit (divided by two) for each succeeding delayed clock pulse until a value of 0, 0, 0, 1 is obtained. (See Table 4.) This value is held until the readout cycle is accomplished.

The third "1" detection from N11 also turns off M10 and turns on M11. The operation of M11 and N14 is identical to that of M10 and N11 since they are "or" gated at N13. However, when a pulse passes N14 it turns "off" M11 and completes the readout cycle since no further log values will be read. The value stored in the Log Accumulator is therefore the sum of up to four log values obtained from the appropriate *n*, *x*, *y*, and/or *z* values in the original input word.

For an example of this operation let us again refer to the decimal number 87 which provides the binary word 1 0 1 0 1 1 1. The following table illustrates the log accumulation for the decimal number 87:

TABLE 6

| Binary Word | Decimal No.=Value | Table No. | Address Bit Number | Digital Word |
|---|---|---|---|---|
| 1 | $64=2^6$ | 2 | 1 | 1 1 0 1 1 0 1 1 |
| 0 | | | | |
| 1 | $16=2^4$ | 3 | 2 | 0 0 0 0 1 1 0 0 |
| 0 | | | | |
| 1 | $4=2^3$ | 5 | (1) | 0 0 0 0 0 0 1 1 |
| 1 | $2=2^1$ | 5 | [2] 1 | 0 0 0 0 0 0 0 1 |
| 1 | $1=2^0$ | (3) | (3) | |
| | 235= | | | 1 1 1 0 1 0 1 1 |

235×.00825 (LSB)=1.93875 (Actual log of 87 is 1.9395)

[1] 3rd Store.
[2] Of 3rd Store.
[3] Gate N14 is closed.

The Log Accumulator will produce on its output 20 the digital word 1 1 1 0 1 0 1 1 which provides an equivalent decimal number of 235 which, when multiplied by the LSB, will give the approximate logarithm of the decimal number 87. Thus, it may be seen that a log error of only .00075 exists for the number 87. In like manner when other decimal numbers, which can be converted into a seven bit digital number, can be readily computed into the approximate logarithm of that decimal number, it would only be necessary to multiply the digital log of the number represented by the LSB to provide this approximated logarithm.

Figure 3:
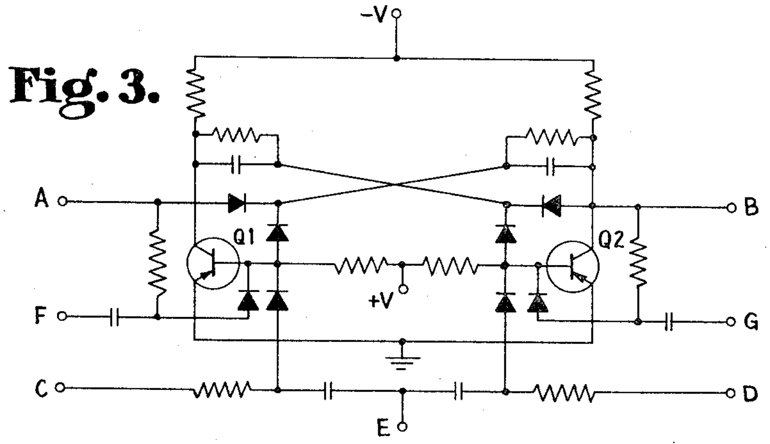
FIGURE 3 shows a circuit schematic of a standard multivibrator circuit used in the circuits of FIGURES 1 and 2.

Referring more particularly to FIGURE 3, there is illustrated a circuit schematic diagram of a transistor bistable multivibrator, well known in its construction and operation by those skilled in the art. In this multivibrator transistors Q1 and Q2 are arranged in the multivibrator circuit in which trigger inputs are shown at E, F, G, and control or steering gate inputs are shown for terminals C and D. The outputs are taken from the collector terminals A and B. The multivibrator circuit of FIGURE 3 is used in all the M blocks shown used in FIGURES 1 and 2 with the terminals A through G coupled as shown in FIGURES 1 and 2. In FIGURE 3 the "1" output is taken as the output from terminal B so that a positive trigger at terminal G will produce a "0" state output of negative voltage from terminal B while a trigger at F will produce a "1" state output of zero voltage from terminal B. The opposite condition of terminal B will also exist at the output terminal A. A trigger at terminal E will produce a B output which is a function of the "1" or "0" condition applied to terminals C and D. If a "1" is applied to terminal D and a "0" is applied to terminal C, the diode in the circuit from terminal E through the capacitor to the base of transistor Q2 will conduct for an E trigger turning transistor Q2 "off" and producing a "0" condition at terminal B. If terminals C and D are reversed in their inputs, the E trigger will pass through the diode coupling the terminal E through the capacitor to the base of transistor Q1 to turn transistor Q1 "off" and produce a "1" condition at terminal B.

Figures 4, 5:
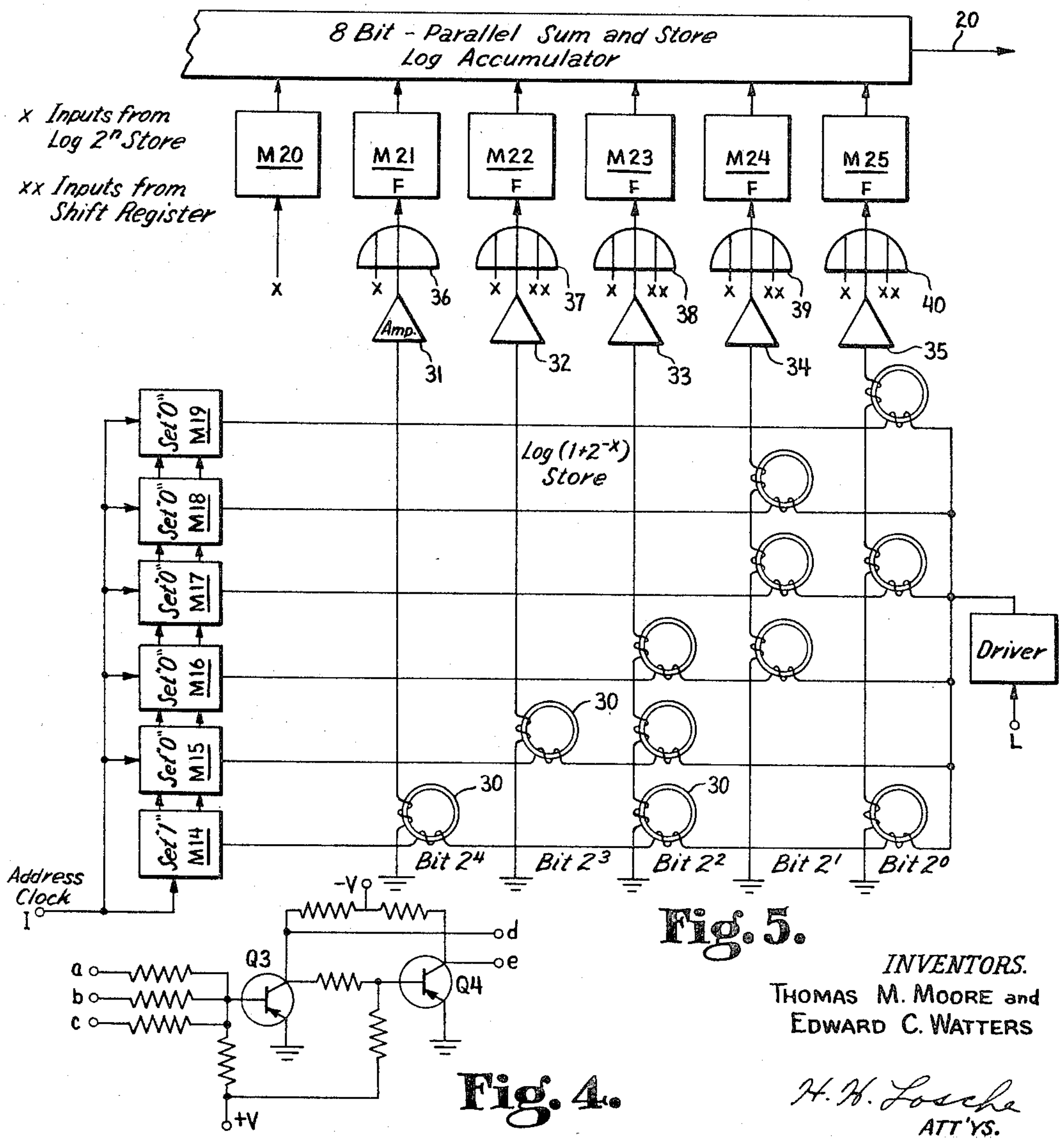
FIGURE 4 shows a conventional NOR circuit schematic used as "and" and "or" circuits in the FIGURES 1 and 2.
FIGURE 5 is a partially block and partially circuit schematic of the log address and store components of FIGURES 1 and 2.

Referring more particularly to FIGURE 4 there is illustrated a circuit schematic diagram of a NOR circuit which is used in all of the N blocks of FIGURES 1 and 2. The reference characters *a* through *e* are applied to like parts in FIGURES 1, 2, and 4. The NOR circuit of FIGURE 4 utilizing two transistors Q3 and Q4 is of well known construction to produce either an "and" circuit, an "or" circuit, or an inverted NOR output. If a "0" (negative voltage) condition is applied to either the *a* terminal, the *b* terminal, or the *c* terminal, transistor Q3 will conduct producing a "1" condition (or zero voltage) on the *d* terminal which is the conventional NOR circuit or $\bar{a}+\bar{b}+\bar{c}=d$. The *d* output is applied to the input of transistor Q4 to produce the inversion so that $abc=e$. The circuit may therefore be used as either an "or" gate or an "and" gate depending upon the sense of the input.

Referring more particularly to FIGURE 5 there is shown a partly block and circuit schematic of the Address, Log Store, and Log Accumulator of the $2^{-x}$ factor shown in blocks in FIGURES 1 and 2. The same structural Address, Log Store, and Log Accumulator is used for the $2^n$ Address, Log Store, and *z* Shift Register except that the memory cores are positioned to provide the different digital words as shown in Tables 2 through 5 hereinabove. The illustration in FIGURE 5 shows the position of transformer cores 30 to provide the digital logarithm condition in accordance with Table 3. For example, the $2^{-x}$ Address memory is provided by the multivibrator series M14 through 19 coupled and arranged so that the address clock input I will cause a "1" condition in M14 to move upwardly through M15 to M19 with each address clock pulse. For the purpose of this invention the multivibrator M14 is preset to its "1" condition while the remaining multivibrators M15 through M19 are orginally set in their "0" condition to provide the digital word of 0 0 0 0 0 1. The transformer core matrix is arranged to produce the digital log word 1 0 1 0 1 when M14 is in its "1" condition; 0 1 1 0 0 when M15 is in its "1" condition; 0 0 1 1 0 when M16 is in the "1" condition; 0 0 0 1 1 when M17 is in the "1" condition; 0 0 0 1 0 when M18 is in the "1" condition; and 0 0 0 0 1 when M19 is in the "1" condition, all as set forth for the 1 through 6 address bit numbers as shown in Table 3. The read driver pulse applied from the conductor L is applied to each of the six parallel lines when a read trigger is applied over conductor L. The other end of each line is connected to one of the bits of the address shift registers M14 through M19 so that when a trigger is applied, the address line, which is connected to the conducting transistor in the address shift register, or the "1" location, will offer a low impedance and current will flow in that line. This current flow through the appropriately located transformer will couple the trigger into the correct output line through amplifiers 31 through 35 and 'or" gates 36 through 40 to the address shift register "1" location in M20 through M25. These current triggers from the matrix will be amplified in amplifiers 31 through 35 as appropriate and fed to the F input of the corresponding bit in the input buffer multivibrator of the parallel adder of the Log Accumulator. The following table will illustrate this process:

TABLE 7

| Value | Address Shift Register "1" Location | Log Value | Digital Representation | Store Read Out |
|---|---|---|---|---|
| $1+2^{-1}$ | $M_{14}$ | 0.1761 | $0.00825(2^4+2^2+2^0)$ | 10101 |
| $1+2^{-2}$ | $M_{15}$ | 0.0969 | $0.00825(2^3+2^2)$ | 01100 |
| $1+2^{-3}$ | $M_{16}$ | 0.0511 | $0.00825(2^2+2^1)$ | 00110 |
| $1+2^{-4}$ | $M_{17}$ | 0.0263 | $0.00825(2^1+2^0)$ | 00011 |
| $1+2^{-5}$ | $M_{18}$ | 0.0133 | $0.00825(2^1)$ | 00010 |
| $1+2^{-6}$ | $M_{19}$ | 0.0065 | $0.00825(2^0)$ | 00001 |

The same process can be applied to all other log values and stores. The *x* input to the "or" circuits 36 through 40 are from the Log $2^n$ Store blocks as shown in FIGURES 1 and 2 while the *xx* inputs are from the *z* Shift Register of FIGURES 1 and 2. The eight bit parallel sum and store Log Accumulator in FIGURE 5 will therefore digitally add and accumulate all of the inputs from the Log $2^n$ Store, the Log $2^{-x}$ Store, and the *z* Shift Register, to produce on the log Accumulator output the digital log of the decimal number placed in the input register. This digital log number is then multiplied by the LSB of 0.00825 to provide the approximate common log of the number in the Input Register. In this manner any decimal number converted to its binary counterpart placed in the Input Register will have its digital log number computed in the Log Accumulator on the output 20 for that decimal number. While the actual logarithm derived from the multiplication of the LSB is an approximation of the true logarithm of the input number, the error in the approximate logarithm of the number should never exceed the value of one-half of the LSB. This error exists from the close approximation of the *y* factoring and *z* factoring rounded off to its closest approximate value although this digital factoring may be carried out to a greater length but would require additional hardware to accomplish a greater accuracy. The system disclosed herein provides a method for determining directly the digital logarithm of a binary number without using a full look-up table containing all possible logarithms. The system described is for use on seven bit numbers to an accuracy of one percent and uses an eight bit log to minimize the quantizing error. By changing the values in the log stores the log to other bases may be found.

While many modifications and changes may be made in the constructional details and features of this invention to provide more accuracy in the resulting logarithm answer by the enlargement of hardware following the teaching of this invention, it is to be understood that we desire to protect the spirit and scope of our invention only in the scope of our appended claims.

We claim:

1. A digital log computer comprising:

an input digital register set for each digital word representative of a decimal number to be computed in a logarithm;

first and second digital address shift registers for each of two factors representative of the two most significant bits of a digital log series of predetermined bits;

a first and second log storage means connected respectively to said first and second digital address registers to convert said factors to digital numbers representative of the logarithms of said factors;

a low log store providing a digital number of low order factors representative of the lower order bits of said digital log series;

a third digital shift register coupled to said low order log store to read in said digital number of said low order factor;

a log accumulator coupled to said first and second log storage means and to said third digital register to accumulate digital words stored in said log storage means and said third digital register representative of the logarithm of a number;

a clock pulse source for producing clock pulses and delayed clock pulses;

a plurality of digital "1" detectors; and a plurality of gating means interconnected with said input register, said first and second digital address shift registers, said first and second log storage means, said third digital shift register, said plurality of digital "1" detectors, and said clock pulse source to gate the most significant "1" of said input register to said first digital address shift register, to gate the second most significant "1" of said input register to said second digital address register, and to gate lower order digital "1" bits to said lower order log store and register to produce gated readout of said first and second log storage means and said third digital shift register into said log accumulator in accordance with the gating sequence of the most significant digital "1" readout of said number in said input register whereby said digital number representative of a decimal number in said input register is computed in a digital number representative of the logarithm of said decimal number on an output of said log accumulator.

2. A digital log computer as set forth in claim 1 wherein:

said plurality of digital "1" detectors include three digital "1" detectors to detect the first three most significant bits and include two additional digital "1" detectors to determine a reoccurrence of the order of the two most significant bits of said input register digital number to condition gates in said plurality of gating means to cause read-in to said log accumulator of said second log store and said third digital shift register, being the third and fourth factors of said digital log series.

3. A digital log computer as set forth in claim 2 wherein said plurality of gating means include two gates coupled to the most significant bit of said input register, one gate of which is coupled to receive said clock pulses and the other of which is coupled to receive said delayed clock pulses, the output of the gate for the clock pulses being coupled through another gate to produce readout of said first log store and of said low order log store, and the other gate of which is coupled to receive said delayed clock pulses being coupled through other gates of said plurality of gates to said first and second digital address shift register to shift same up one digital number with each pulse and coupled to said third digital shift register to shift same down one digital number with each pulse.

4. A digital log computer as set forth in claim 3 wherein said plurality of gating means includes two "and" gates and an "or" gate coupled to the two additional digital "1" detectors and to the second and third most significant bits of said input register to produce a readout pulse in a coupling through another gating means to said second log storage means and said third digital shift register.

5. A digital log computer comprising:

an input digital register of seven multivibrator bits setable to a binary number representative of a decimal number to be computed into a digital number representative of the logarithm of the decimal number;

a first register and log store set to a digital word representative of an *n* factor of the most significant bit in a binary expansion;

a second address register and log store set to a digital word representative of an *x* factor of the second most significant bit in the binary expansion, said second address register being advanceable to the next digital number representative of a *y* factor of the third most significant bit in the binary expansion;

a logarithm store setable to a digital word representative of a *z* factor of the fourth most significant bit in the binary expansion, said logarithm store being coupled to a *z* shift register, said *z* shift register being shiftable downward to represent lower order bits in the digital expansion;

a log store accumulator coupled to said first and second log stores and to said *z* shift register to accumulate readout in a digital word representative of the logarithm of said input binary word on an output thereof;

a clock pulse source having a clock pulse output and a delayed clock pulse output coupled to said seven multivibrator bits to advance each lower order bit to the next higher order with each delayed clock pulse;

a plurality of six "1" detection multivibrators; and a plurality of fifteen "and" and "or" gates, the sixth through tenth and twelfth of which are readout control "and" gates with the output of the sixth coupled to said first address and log store, with the output of the seventh coupled to said second address and log store and to said *z* shift register, with the output of the eigthth coupled as a readout signal to said first log store, with the output of the ninth coupled to said *z* logarithm store to cause the read-in of same to said $z$ shift register, with the output of the tenth coupled to said second log store, with the output of said twelfth being coupled to said $z$ shift register, and with the first through fifth, eleventh, and thirteenth through fifteenth being interconnected with said six multivibrators of said register input, said six "1" detector multivibrators, said sixth through tenth and twelfth readout control "and" gates, and said clock pulse and delayed clock pulse outputs constructed and arranged to detect the most significant bit in the input binary word for each clock pulse and to detect the $x$, $y$, and $z$ qualifying factors whereby the log stores and $z$ shift register digital values will be read into said log accumulator representative of the logarithm of the digital input word.

6. A digital log computer as set forth in claim 5 wherein said first and second address registers and respective log stores each comprise a digital register with each bit output inductively coupled through magnetic cores in a matrix in common to said readout output of the respective "and" gate and with each magnetic core magnetically coupled to an output conductor, said cores being arranged to provide the digital word output of the logarithm of the digital word in said digital register whereby said output conductors coupled to said log accumulator add in the digital words of said first and second log stores to the digital word of said $z$ shift register to produce the accumulated digital word representative of the logarithm of said input binary word.

7. A digital log computer as set forth in claim 6 wherein said first and second address registers are constructed and arranged to count up in digital sequence with each delayed clock pulse gated through by said sixth and seventh "and" gates while said $z$ shift register is constructed and arranged to count down in digital sequence with each delayed clock pulse gated through by said seventh "and" gate.

8. A digital log computer as set forth in claim 7 wherein said input register of said plurality of seven multivibrators in coupled relation each provide a binary number constituting a digital bit to produce said digital word representative of the decimal number to be computed in a logarithm, the most significant "1" constituting a signal for an $n$ factor, the next most significant "1" constituting a signal for an $x$ factor, the third most significant "1" repeating a prior "1" not separated by more than two binary "0's" constituting a signal for a $y$ factor, and lower significant "1" bits constituting signals for said $z$ factors.

9. A digital log computer as set forth in claim 8 wherein said first address register and said first log store constitute said $n$ factor register and store in digital words representative of a logarithm of the factor $n$, said second address register and second log store constitute the digital words of a logarithm of the factor $x$, the advanced one address of said $x$ factor constituting a digital word of a logarithm of the $y$ factor whereby all factors $n$, $x$, $y$, and $z$ are accumulated in said log accumulator after a number of clock and delayed clock pulses equivalent in number to the number of digital bits in said input binary number.

10. A digital log computer as set forth in claim 9 wherein said fifth "and" gate is coupled to the first and second of said "1" detector multivibrators arranged to gate through a delayed clock pulse to switch said first "1" detector multivibrator to produce a "0" output and to switch said second "1" detector multivibrator to produce a "1" output for detecting the second most significant "1" in said input digital word, and said second "1" detector multivibrator is coupled with said ninth "and" gate including a coupling of the readout output of said ninth "and" gate to said second and the third "1" detector multivibrators to switch said second "1" detector multivibrator to produce a "0" output simultaneously with switching said third "1" detector multivibrator to produce a "1" output for detecting tne third most significant "1" in said input digital word.

11. A digital log computer as set forth in claim 10 wherein the first through third of said plurality of "and" and "or" gates and the fifth and sixth "1" detector multivibrators are coupled and arranged with said second and third "and" gates coupled to said second and third highest order bits of said input register to provide a $y$ qualifying register for detecting the reoccurrence of the sequence of the binary "1" bits in the input digital word to cause a read-in of the advanced one address of the $x$ factor into said log accumulator.

References Cited

UNITED STATES PATENTS

| | | | |
|---|---|---|---|
| 3,036,774 | 5/1962 | Brinkerhoff | 235—164 |
| 3,194,951 | 7/1965 | Schaefer | 235—154 |
| 3,210,530 | 10/1965 | Bravenec | 235—193 |
| 3,274,376 | 9/1966 | Evans et al. | 340—172.5 |

MAYNARD R. WILBUR, *Primary Examiner.*

W. W. NIELSEN, *Assistant Examiner.*

U.S. Cl. X.R.

235—197; 340—172.5

U.S. DEPARTMENT OF COMMERCE

PATENT OFFICE

Washington, D.C. 20231

UNITED STATES PATENT OFFICE
CERTIFICATE OF CORRECTION

Patent No. 3,436,533

April 1, 19

Thomas M. Moore et al.

It is certified that error appears in the above identified patent and that said Letters Patent are hereby corrected as shown below:

Column 2, lines 47 to 51, the equation should appear as shown below:

$$87 = 2^6\left(1 + \frac{1}{2^2}\right)\left(1 + \frac{1}{2^4}\right)\left[1 + \frac{1}{2^5\left(1 + \frac{1}{2^2}\right)\left(1 + \frac{1}{2^4}\right)}\right]$$

Signed and sealed this 21st day of April 1970.

(SEAL)
Attest:

Edward M. Fletcher, Jr.
Attesting Officer

WILLIAM E. SCHUYLER, JR.
Commissioner of Patents